United States Patent [19]

Huang

[11] Patent Number: 5,625,923
[45] Date of Patent: May 6, 1997

[54] STROLLER LENGTH-ADJUSTABLE HANDLE

[76] Inventor: Li-chu C. Huang, No. 9, Alley 2, Lane 606, Sec. 2, Po-Ai Rd., Chiayi City, Taiwan

[21] Appl. No.: 579,883

[22] Filed: Dec. 28, 1995

[51] Int. Cl.⁶ .................................................. A47B 95/02
[52] U.S. Cl. ........................................ 16/115; 280/47.371
[58] Field of Search .................... 16/115; 280/47.315, 280/47.371, 655, 655.1; 190/14, 15 R, 104, 115, 117

[56] References Cited

U.S. PATENT DOCUMENTS

| | | | |
|---|---|---|---|
| 3,669,463 | 6/1972 | Boudreau | 16/115 |
| 4,412,689 | 11/1983 | Lee | 280/648 |
| 4,577,877 | 3/1986 | Kassai | 16/115 |
| 4,586,399 | 5/1986 | Kassai | 280/47.371 |
| 4,924,725 | 5/1990 | Takahashi et al. | 280/47.371 |
| 5,393,079 | 2/1995 | Wang | 280/655.1 |

*Primary Examiner*—Chuck Y. Mah
*Attorney, Agent, or Firm*—Gunn, Lee & Miller, P.C.

[57] ABSTRACT

A length-adjustable handle structure for a stroller comprises an outer tube, a stationary block affixed to an upper end of the outer tube, an inner tube extending through the stationary block and slidably received within the outer tube, the inner tube having a plurality of holes defined along a length thereof, an engaging block having a boss for extending into one of the plurality of holes of the inner tube to immobilize the inner tube with respect to the outer tube, and a spring urging against a wall of the outer tube to releasably press the engaging block to retain the boss extended in the hole of the inner tube. The engaging block together with the boss can be released from one of the plurality of holes of the inner tube by finger pressure, so that the inner tube can be moved to a second position.

15 Claims, 8 Drawing Sheets

STROLLER LENGTH-ADJUSTABLE HANDLE

BACKGROUND OF THE INVENTION

1. Field of the Invention

The present invention relates to a length-adjustable handle, and more particularly to a length-adjustable handle for a stroller.

2. Description of Related Art

Pushcarts are popular devices for transportation of babies. However, a handle of a conventional stroller can not be adjusted according to the height of the user so it is inconvenient to use. Thus there has been a long and unfulfilled need for the handle which can be adjusted to any desired positions.

The present invention provides a length-adjustable handle to mitigate and/or obviate the aforementioned problems.

SUMMARY OF THE INVENTION

The primary object of the present invention is to provide a handle of a stroller which can be adjusted according to the height of the user thereby allowing the handle to be easily converted from one length to another desired length.

In accordance with the present invention, there is provided a length-adjustable handle of a stroller comprising an outer tube; a stationary block affixed to an upper end of the outer tube; an inner tube extending through the stationary block and slidably received within the outer tube, the inner tube having a plurality of holes along a length thereof; an engaging block having a protruding boss for extending into one of the plurality of holes of the inner tube to immobilize the inner tube with respect to the outer tube; and a spring bearing against a wall of the outer tube to releasably urge the engaging block to retain the boss extended into the hole of the inner tube.

The stationary block has a passageway defined therein and in communication with the recess and the engaging block has a first hole defined therein and which is aligned with the passageway when received in the stationary block to allow the inner tube to extend therethrough.

The engaging block defines an aperture parallel to the recess of the stationary block for receiving the spring.

According to another aspect of the present invention, there is provided a length-adjustable handle of a stroller comprising an outer tube; a stationary block affixed to an upper end of the outer tube; an inner tube extending through the stationary block and slidably received within the outer tube, the inner tube having a plurality of second holes defined therein along a length thereof; an engaging block having a boss for extending into one of the plurality of second holes of the inner tube to immobilize the inner tube with respect to the outer tube; and a spring urging against between the stationary block and the engaging block to releasably urge the engaging block to retain the boss extended into one of the plurality of second holes of the inner tube.

The stationary block has a groove at the bottom with an aperture and the engaging block with a corresponding aperture is received in the groove and the corresponding aperture is aligned and engaged with a periphery defining the aperture of the stationary block by a pin. Additionally, the stationary block has a passageway defined therein to allow the inner tube to extend therethrough.

The engaging block has a first end which can be pressed downwardly for minimizing a locking effect between the boss and one of the second holes of the inner tube enabling the inner tube to be moved to another one of the second holes and a second end with a first hole defined therein parallel to the boss for receiving the spring.

Whereby, the user can use a finger to press the engaging block together with the boss inwardly or downwardly so that the inner tube can be slid to a proper position, then the user releases finger pressure and the boss can extend through another hole by the force of the spring. The handle is simple in structure, so it is convenient to operate.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
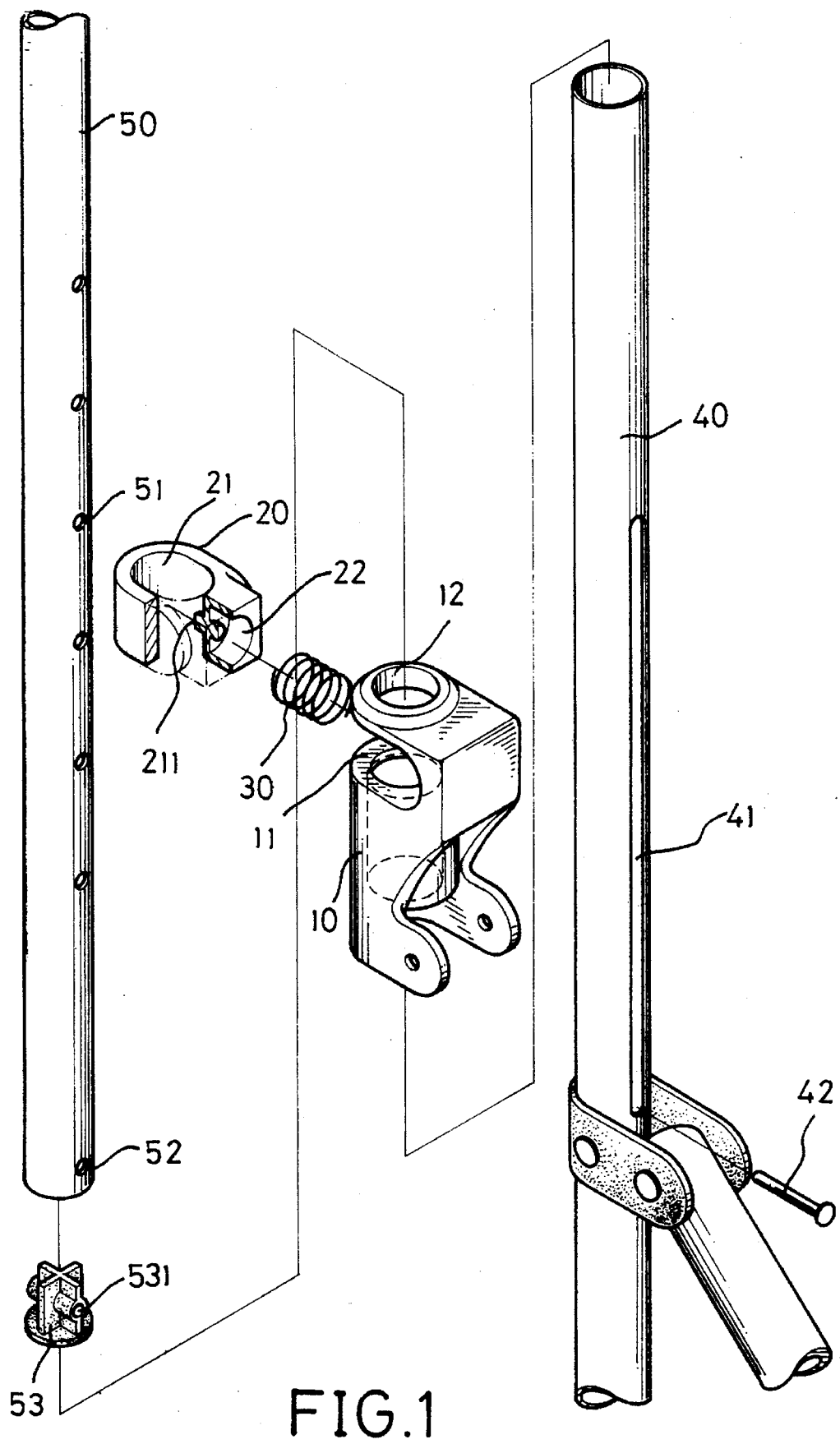
FIG. 1 is an exploded view of a length-adjustable handle structure for a stroller in accordance with the present invention.

Referring to drawings and in particular FIG. 1, a length-adjustable handle in accordance with the present invention comprises a stationary block 10, an engaging block 20, a spring 30, an outer tube 40 and an inner tube 50.

The stationary block 10 defines a transverse recess 11 and a longitudinal passageway 12 in communication with the recess 11.

The engaging block 20 defines a first hole 21 and an aperture 22 parallel to the recess 11 of the stationary block for accommodating the spring 30. The engaging block 20 is inserted into the recess 11, after which the first hole 21 is aligned to the longitudinal through hole 12, thereby the inner tube 50 can extend through the passageway 12 and aperture 22, respectively. Additionally, an internal diameter of the first hole 21 of the engaging block 20 is larger than the outside diameter of the inner tube 50. A boss 211 is formed on the periphery of the first hole 21 and extends to the aperture 22.

The inner tube 50 has a plurality of second holes 51 defined therein along a length thereof. The boss 211 extends into one of the plurality of the second holes 51 to restrict movement of the inner tube 50 with respect to the outer tube 40. An end cap 53 with a transverse hole 531 is mounted to a lower end of the inner tube. A third hole 52 transversely extends through the lower end of the inner tube 50 and matches the transverse hole 531. After the end cap 53 is attached to the inner tube 50, the transverse hole 531 is aligned to the third hole 52.

Figure 2:
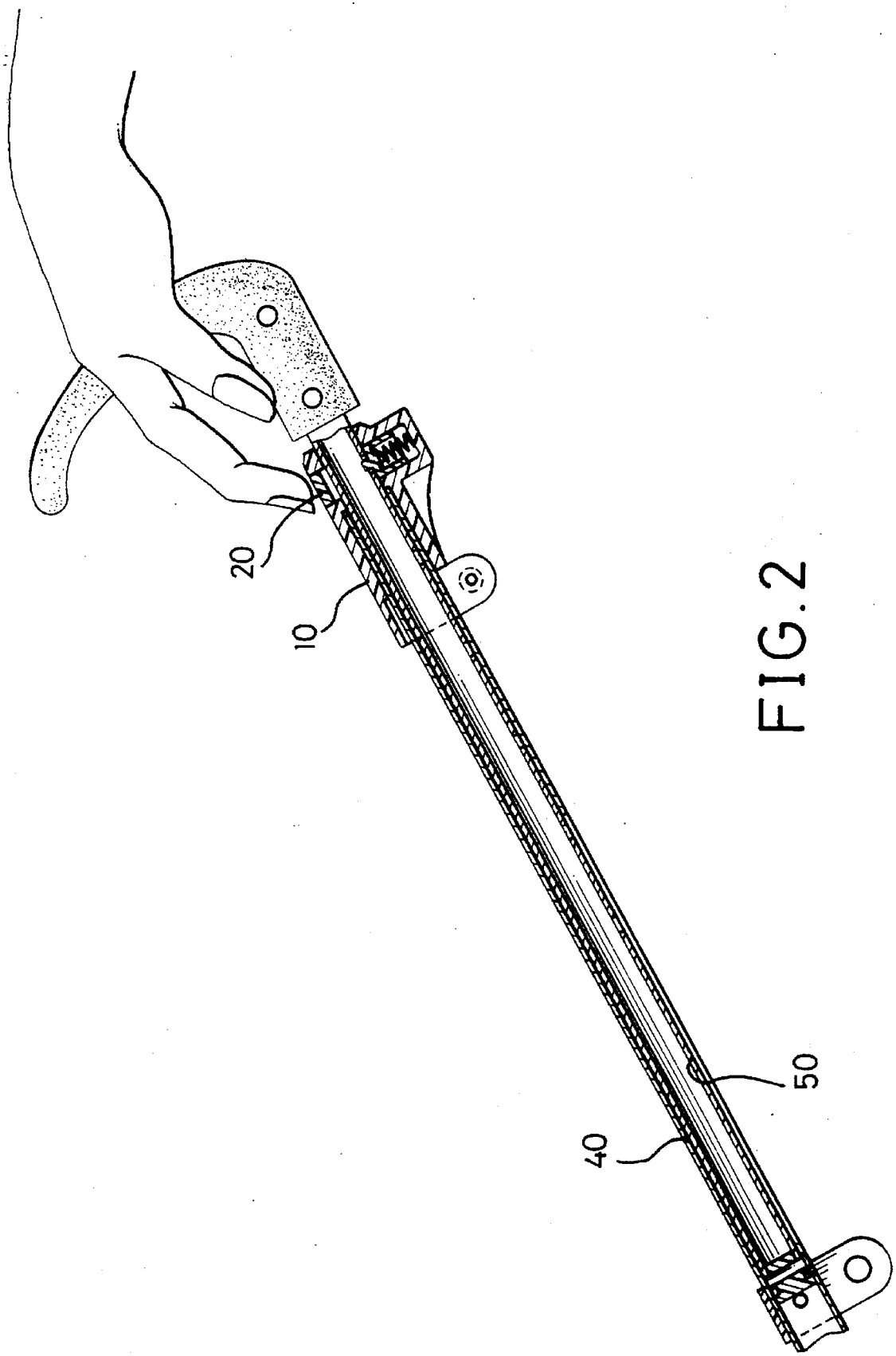
FIG. 2 is a side cross-sectional view of the length-adjustable handle of the present invention showing an engaging block engaged with an inner tube.
Figure 3:
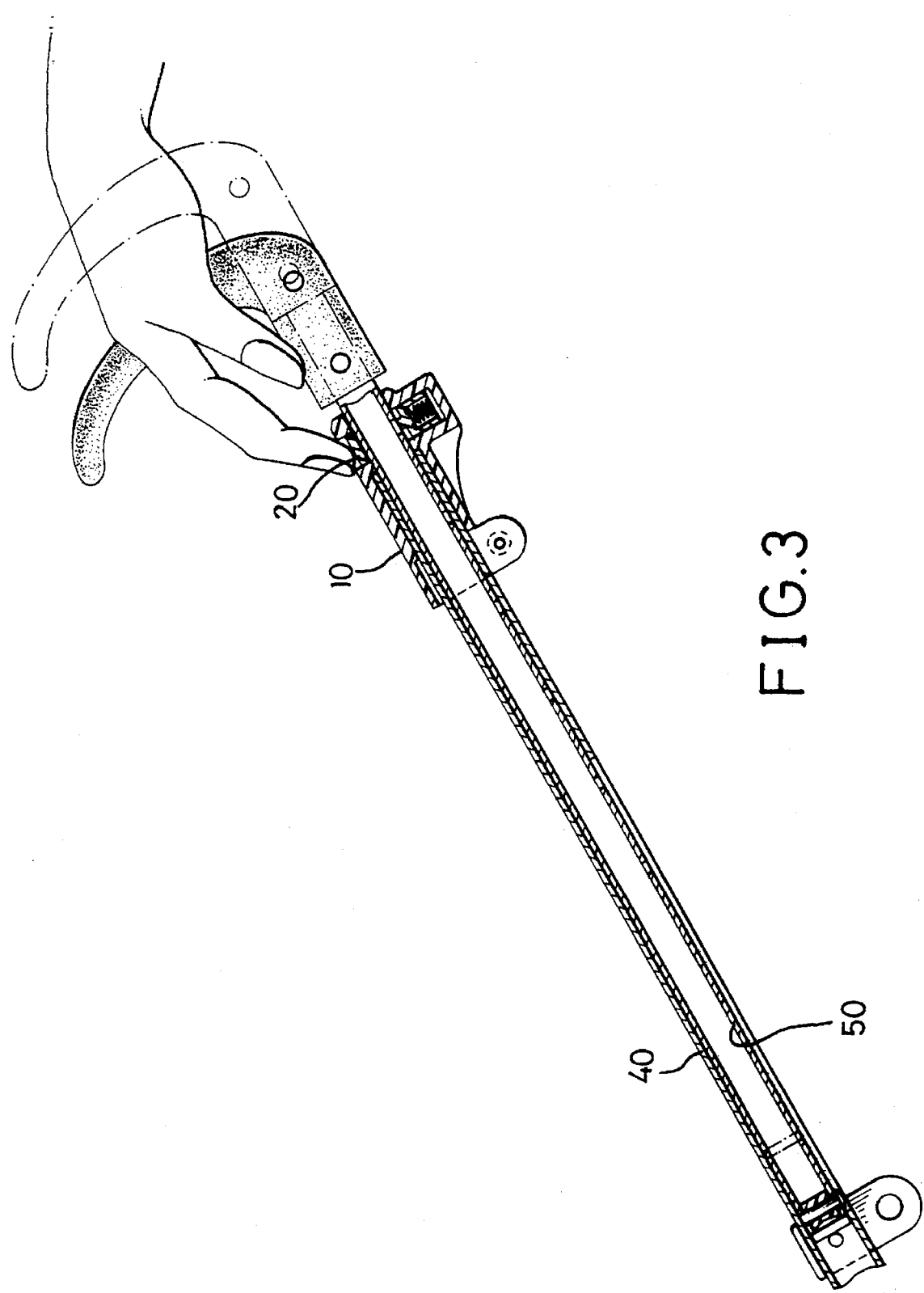
FIG. 3 is a side cross-sectional view of the length-adjustable handle of the present invention showing the engaging block disengaged with the inner tube.

FIGS. 2 and 3 illustrate the engaging block 20 engaged and disengaged with the inner tube 50, respectively.

The stationary block 10 is affixed to an upper end of the outer tube 40 and the spring urges against the wall of the outer tube 50 to releasably urge the engaging block 20 to retain the boss 211 extended into the second hole 51 of the inner tube 50. The inner tube 50 is slidably received within the outer tube 40.

Figure 4:
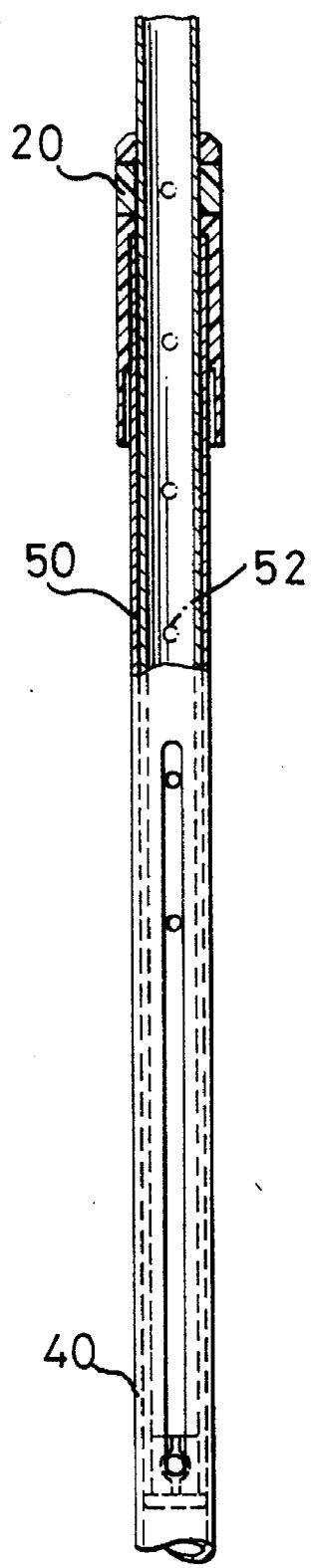
FIG. 4 is a front cross-sectional view of the length-adjustable handle of the present invention showing the coupling relationship of the stationary block, the inner tube and the outer tube.
Figure 5:
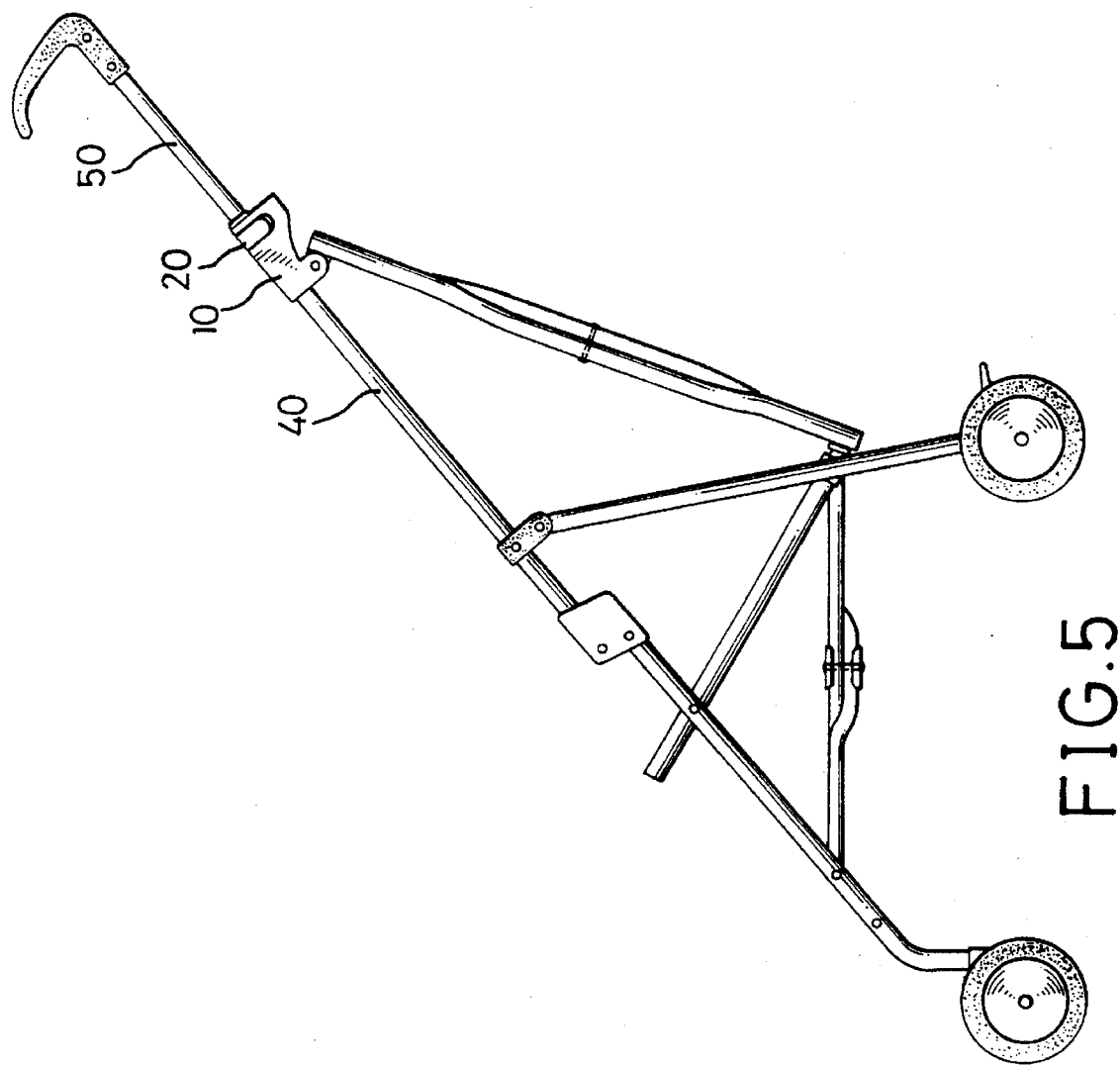
FIG. 5 is a side view of the length-adjustable handle of the present invention fitted in a stroller.

A pin 42 extends through a channel 41 defined along a length of the outer tube 40 and the third hole 52 and then further extends into the transverse hole 531 for preventing the inner tube 50 from sliding out of the outer tube 40 and impeding the inner tube 50 and the outer tube 40 from rotating with respect to each other, as shown in FIG. 4.

Thus, the inner tube 50 may be moved and then retained in a variety of positions by the boss 211 of the engaging block 20 extending through one of the plurality of second holes 51. So that the inner tube 50 may be moved from one position to another position, the boss 211 must be pressed inwardly. To accomplish this easily, since the internal diameter of the first hole 21 of the engaging block 20 is larger than the outside diameter of the inner tube 50, a user can press by finger the engaging block 20 together with the protruding pin 211 inwardly to enable the boss 211 to be disengaged with the inner tube 50 so that the inner tube 50 can be slid to a proper position, then the user releases finger pressure on the engaging block 20 and the boss 211 can extend through another second hole 51 by the force of the spring 30, as shown in FIG. 3.

Figure 6:
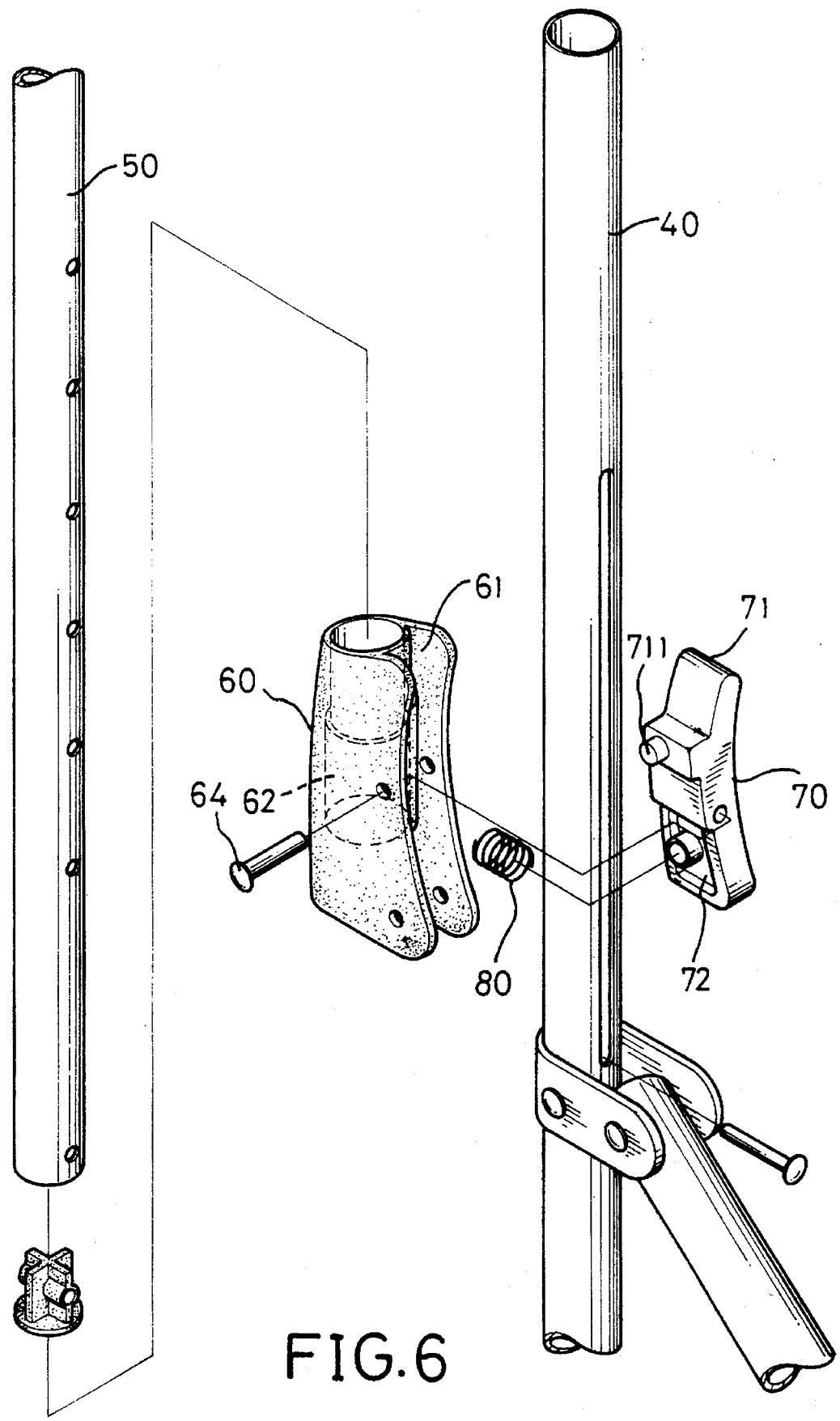
FIG. 6 is an exploded view of a length-adjustable handle structure for a stroller in accordance with another embodiment.
Figure 7:
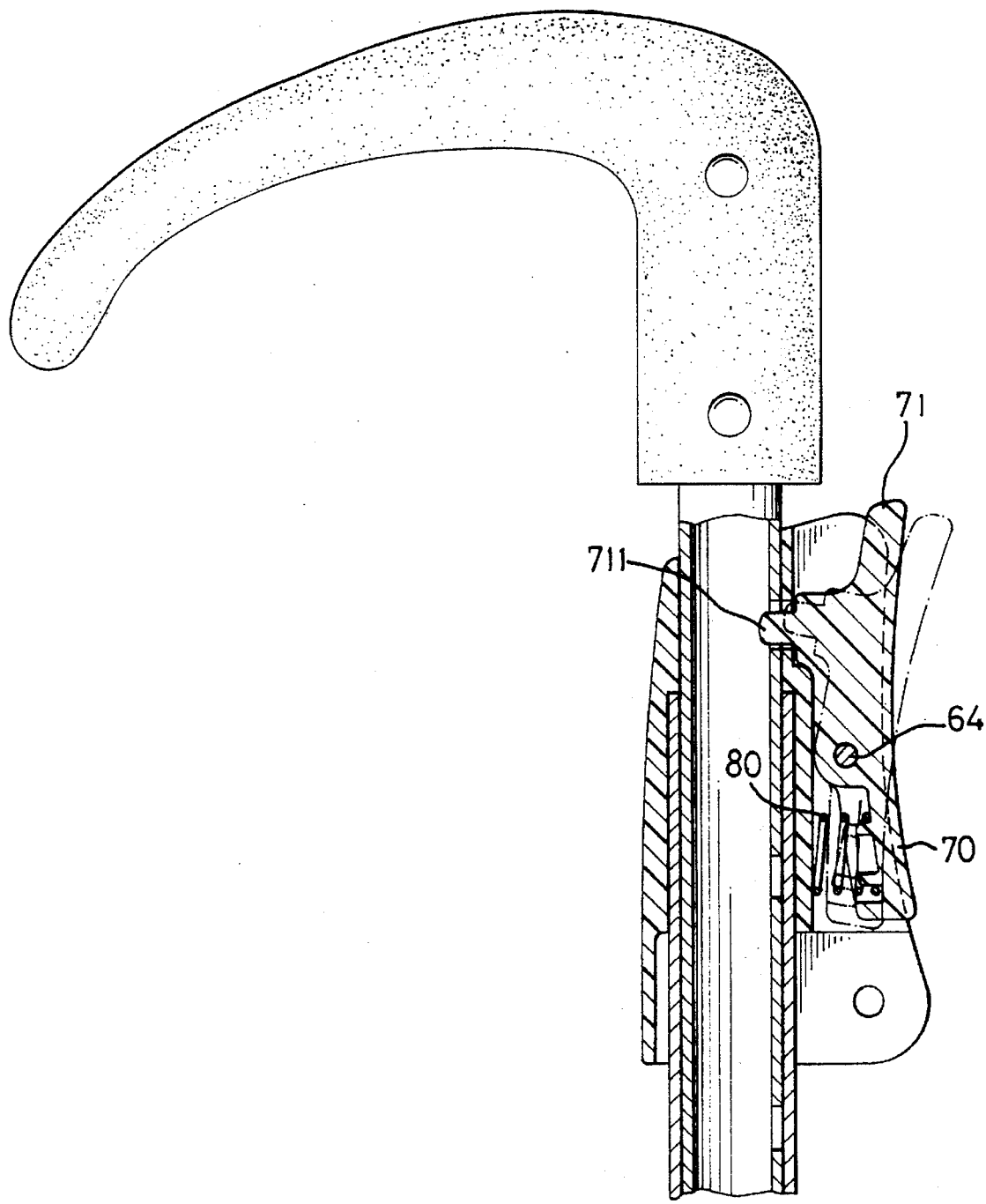
FIG. 7 is a side cross-sectional view of the length-adjustable handle of FIG. 6 showing an engaging block engaged with an inner tube.
Figure 8:
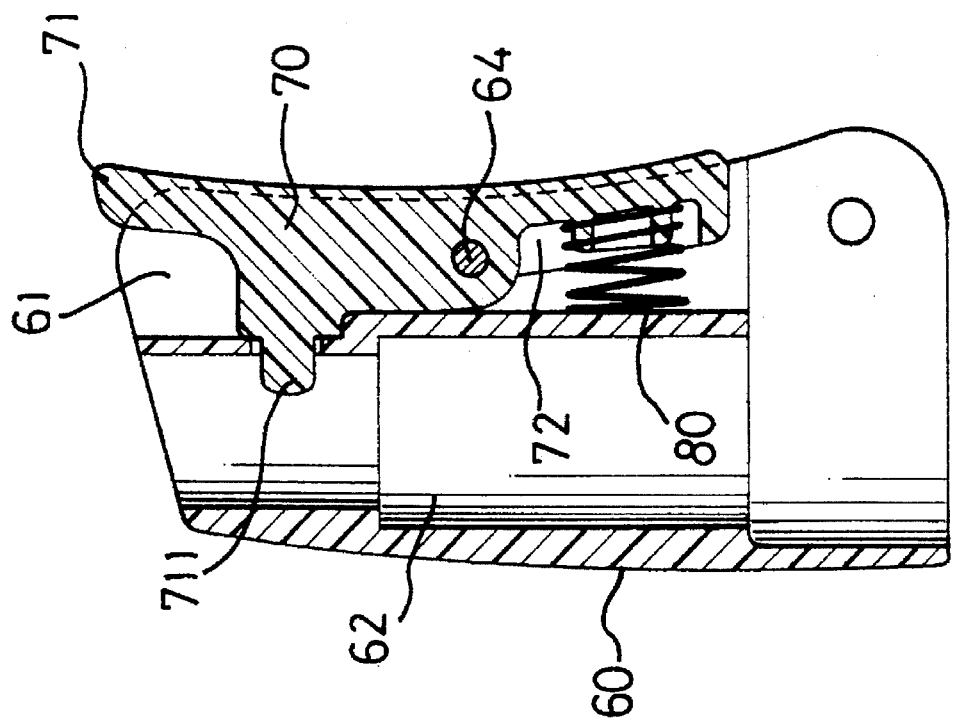
FIG. 8 is a side cross-sectional view of the length-adjustable handle of FIG. 6 showing the engaging block disengaged with the inner tube.

Now referring to FIGS. 6, 7 and 8 which show a length-adjustable handle of another embodiment including a stationary block 60, an engaging block 70, a spring 80, an outer tube 40 and inner tube.

Wherein the stationary block 60 defines a groove 61 at the bottom with an aperture and a longitudinal passageway 62 for allowing the inner tube 50 to extend therethrough.

The engaging block 70 is received within the groove 61 and defines a corresponding aperture which is aligned and engaged with the aperture of the stationary block by a pin 64. The engaging block 70 has a first end 71 with a boss 711 formed on the periphery thereof adjacent to the passageway 62 and a second end with a first hole 72 defined thereon parallel to the boss 711 for accommodating the spring 80.

The outer tube 40 and the inner tube 50 are substantially the same as the structure of the first embodiment and will not be described in further detail here.

FIGS. 7 and 8 illustrate the engaging block 70 engaged and disengaged with the inner tube 50, respectively.

The stationary block 60 is affixed to an upper end of the outer tube 40 and the spring 80 urges against between the stationary block 60 and the engaging block 70 to retain the boss 711 extended into one of the second holes 51 of the inner tube 50. The inner tube 50 is slidably received within the outer tube 40.

The inner tube 50 may be moved from one position to another position, the boss 711 must be pressed downwardly. To accomplish this easily, the user can press by finger the end 71 of the engaging block 70 together with the boss 711 downwardly to enable the boss 711 to be disengaged with the inner tube 50 so that the inner tube 50 can be slid to a proper position, then the user releases finger pressure on the end 71 and boss 711 can extend through another second hole 51 by the force of the spring 80, as shown in FIG. 7.

It should be clear to those skilled in the art that further embodiments of the present invention may be made without departing from the teachings of the present invention.

What is claimed is:

1. A length-adjustable handle structure for a stroller comprising:

an outer tube;

a stationary block affixed to an upper end of the outer tube;

an inner tube extending through the stationary block and slidably received within the outer tube, the inner tube having a plurality of first holes defined therein along a length thereof;

an engaging block having a boss for extending into one of the plurality of first holes of the inner tube to immobilize the inner tube with respect to the outer tube; and a spring compressed between the stationary block and the engaging block to releasably urge the engaging block to retain the boss extended into one of the plurality of first holes of the inner tube;

wherein the stationary block has a recess for receiving the engaging block and a passageway in communication with the recess, and the engaging block has a second hole, which is aligned with the passageway when received in the stationary block to allow the inner tube to extend therethrough.

2. The length-adjustable handle structure as claimed in claim 1, wherein the engaging block defines an aperture parallel to the recess of the stationary block for receiving the spring.

3. The length-adjustable handle structure as claimed in claim 2, wherein the internal diameter of the second hole of the engaging block is larger than the outside diameter of the inner tube.

4. The length-adjustable handle structure as claimed in claim 3, wherein the inner tube defines a third hole adjacent to its lower end and the outer tube further comprises a channel defined therein along a length thereof, a pin extending through the channel and the third hole of the inner tube for preventing the inner tube from sliding out of the outer tube.

5. The length-adjustable handle structure as claimed in claim 4, further comprising an end cap mounted to a lower end of the inner tube, having a transverse hole aligned to the third hole of the inner tube with the pin further extending into the transverse hole.

6. A length-adjustable handle structure for a stroller comprising:

an outer tube having a channel defined therein along a length thereof;

a stationary block affixed to an upper end of the outer tube;

an inner tube extending through the stationary block and slidably received within the outer tube, the inner tube having a plurality of first holes defined therein along a length thereof, and defines a second hole adjacent to its lower end;

a pin extending through the channel and the second hole of the inner tube for preventing the inner tube from sliding out of the outer tube;

an engaging block having a boss for extending into one of the plurality of first holes of the inner tube to immobilize the inner tube with respect to the outer tube; and a spring compressed between the stationary block and the engaging block to releasably urge the engaging block to retain the boss extended into one of the plurality of first holes of the inner tube.

7. The length-adjustable handle structure as claimed in claim 6, wherein the stationary block has a groove with an aperture and the engaging block with a corresponding aperture is received in the groove and the corresponding aperture is aligned and engaged with the aperture of the stationary block by a pin.

8. The length-adjustable handle structure as claimed in claim 7, wherein the stationary block has a passageway defined therein to allow the inner tube to extend therethrough.

9. The length-adjustable handle structure as claimed in claim 8, wherein the engaging block has a first end which can be pressed downwardly for minimizing a locking effect between the boss and one of the first holes of the inner tube enabling the inner tube to be removed to another one of the first holes.

10. The length-adjustable handle structure as claimed in claim 9, wherein the engaging block has a second end with a hole defined therein parallel to the boss for receiving the spring.

11. The length-adjustable handle structure as claimed in claim 6, further comprising an end-cap mounted to a lower end of the inner tube, having a transverse hole aligned to the second hole of the inner tube with the pin further extending into the transverse hole.

12. The length-adjustable handle structure as claimed in claim 11, wherein the stationary block has a groove with an aperture and the engaging block with a corresponding aperture is received in the groove and the corresponding aperture is aligned and engaged with the aperture of the stationary block by a pin.

13. The length-adjustable handle structure as claimed in claim 12, wherein the stationary block has a passageway defined therein to allow the inner tube to extend therethrough.

14. The length-adjustable handle structure as claimed in claim 13, wherein the engaging block has a first end which can be pressed downwardly for minimizing a locking effect between the boss and one of the first holes of the inner tube enabling the inner tube to be moved to another one of the first holes.

15. The length-adjustable handle structure as claimed in claim 14, wherein the engaging block has a second end with a hole defined therein parallel to the boss for receiving the spring.

* * * * *